United States Patent [19]

Almeda, Jr.

[11] Patent Number: 5,045,034
[45] Date of Patent: Sep. 3, 1991

[54] ADJUSTABLE ANTIBACKLASH GEAR SYSTEM

[75] Inventor: Benjamin M. Almeda, Jr., Seattle, Wash.

[73] Assignee: Aurora Crane Corporation, Seattle, Wash.

[21] Appl. No.: 530,856

[22] Filed: May 31, 1990

[51] Int. Cl.⁵ .............................................. F16H 55/18
[52] U.S. Cl. .......................................... 475/5; 475/1; 475/149; 74/409; 74/440; 212/247
[58] Field of Search ................... 475/149, 168, 170, 5, 475/1; 74/395, 396, 409, 440, 397; 212/247

[56] References Cited

U.S. PATENT DOCUMENTS

| | | | |
|---|---|---|---|
| 3,888,134 | 6/1975 | Miranda | 74/409 X |
| 3,949,881 | 4/1976 | Morrow, Sr. et al. | 74/409 X |
| 4,657,200 | 4/1987 | Parylak | 74/395 X |
| 4,736,644 | 4/1988 | Howell | 74/395 |

FOREIGN PATENT DOCUMENTS

| | | | |
|---|---|---|---|
| 59-226762 | 12/1984 | Japan | 74/409 |
| 60-234171 | 11/1985 | Japan | 74/440 |
| 1368425 | 9/1974 | United Kingdom | 74/409 |

OTHER PUBLICATIONS

Gutmann, Fredrick, T., 18 Ways to Control Backlash in Gearing, Oct. 26, 1959.

*Primary Examiner*—Allan D. Herrmann
*Assistant Examiner*—William O. Trousdell
*Attorney, Agent, or Firm*—Christensen, O'Connor, Johnson & Kindness

[57] ABSTRACT

An antibacklash gear drive system including an internal ring gear (46) engaged with a pinion gear (76) powered by a motor drive assembly (48). The motor drive assembly together with the pinion gear is mounted on an eccentric plate (58) so that the rotational axis (72) of the pinion gear is offset from the central axis (66) of the eccentric plate (58). The eccentric plate is adapted to be rotated about its central axis (66) by an adjustment mechanism (86) whereby the distance between the rotational axis (72) of the pinion gear and the rotational axis of the ring gear is varied to increase or decrease, as desired, the engagement of the teeth of the ring and pinion gears thereby to increase or decrease the backlash between the two gears.

9 Claims, 4 Drawing Sheets

ADJUSTABLE ANTIBACKLASH GEAR SYSTEM

TECHNICAL FIELD

The present invention relates to gear systems, and in particular to a system for adjusting the backlash between two mating gears.

BACKGROUND OF THE INVENTION

Backlash is the amount by which the distance between adjacent teeth exceeds the tooth thickness of the mating gear along the pitch circle of the gears. When backlash exists between two gears, one of the gears can be turned through an angle while the mating gear is held stationary. Backlash is necessary to accommodate errors and inaccuracies in the spacing and in the form of the gear teeth. Backlash is also needed to accommodate lubricants, dirt and thermal expansion. Generally, gears are mounted with a backlash of from about $0.03/P_d$ (diametrical pitch) to $0.04/P_d$.

Although in some applications excessive backlash does not present a problem, in many situations significant backlash cannot be tolerated. For instance, in the typical ring/pinion gear or spur/worm gear arrangements used in cranes utilizing elongated booms, the backlash between the gears may be amplified over fiftyfold at the end of the boom. This makes it difficult to position the load being lifted by the boom crane at a desired location with precision. Such boom cranes are typically used on ships, barges, logging trucks, and mobile cranes. Another application in which significant gear backlash cannot be tolerated is in the gear drive of a fire engine ladder.

Attempts have been made to reduce the backlash between gears. One such system uses an antibacklash gear made up of two gears mounted adjacent each other, with one of the gears secured to a drive or driven shaft and the other gear mounted for a limited rotation relative to its adjacent gear. Typically, a spring is interconnected between the two gears to urge the teeth of one gear out of register with the teeth of the other gear, so that the out-of-register teeth of the two gears completely fill the space separating two adjacent teeth of the gear with which the antibacklash gears are engaged. Oftentimes, the two gears composing the antibacklash gear are so highly preloaded relative to each other that the teeth of the drive and driven gears are never unseated relative to each other. This causes excessive tooth wear, especially when heavy torque loads are being transmitted by the gears. Examples of this type of antibacklash gears are disclosed by U.S. Pat. Nos. 3,648,534 and 4,781,073.

SUMMARY OF THE INVENTION

The present invention concerns a system for adjusting the backlash between mating gears without being saddled with the drawbacks of known antibacklash gear systems, including those discussed above. The system of the present invention includes mounting the two gears that are meshed with each other such that the distance separating the rotational axes of the gears may be adjusted. Decreasing the distance between the two axes increases the engagement of the teeth of the two gears which in turn reduces the backlash between the two gears, for instance, to accommodate normal wear of the gear teeth.

In accordance with a more specific aspect of the present invention, one of the two gears is positionable about the other gear along an arcuate path extending generally toward and away from the other gear.

In a yet more specific aspect of the present invention, one of the gears is mounted on a mounting ring. The mounting ring is rotatable about an axis offset from the axis of the gear carried by the mounting ring so that upon rotation of the mounting ring, the gear carrier thereby is moved toward or away from the other gear depending upon the direction that the mounting ring is rotated.

In a further more specific aspect of the present invention one of the two gears is mountable on the base of an elongate boom, and the other gear is mounted on a frame supporting the boom. Also, one of the gears is powered to rotate the boom relative to the support frame.

BRIEF DESCRIPTION OF THE DRAWINGS

The details of a typical embodiment of the present invention can be described in connection with the accompanying drawings, in which.

DETAILED DESCRIPTION OF THE PREFERRED EMBODIMENT

Figure 1:
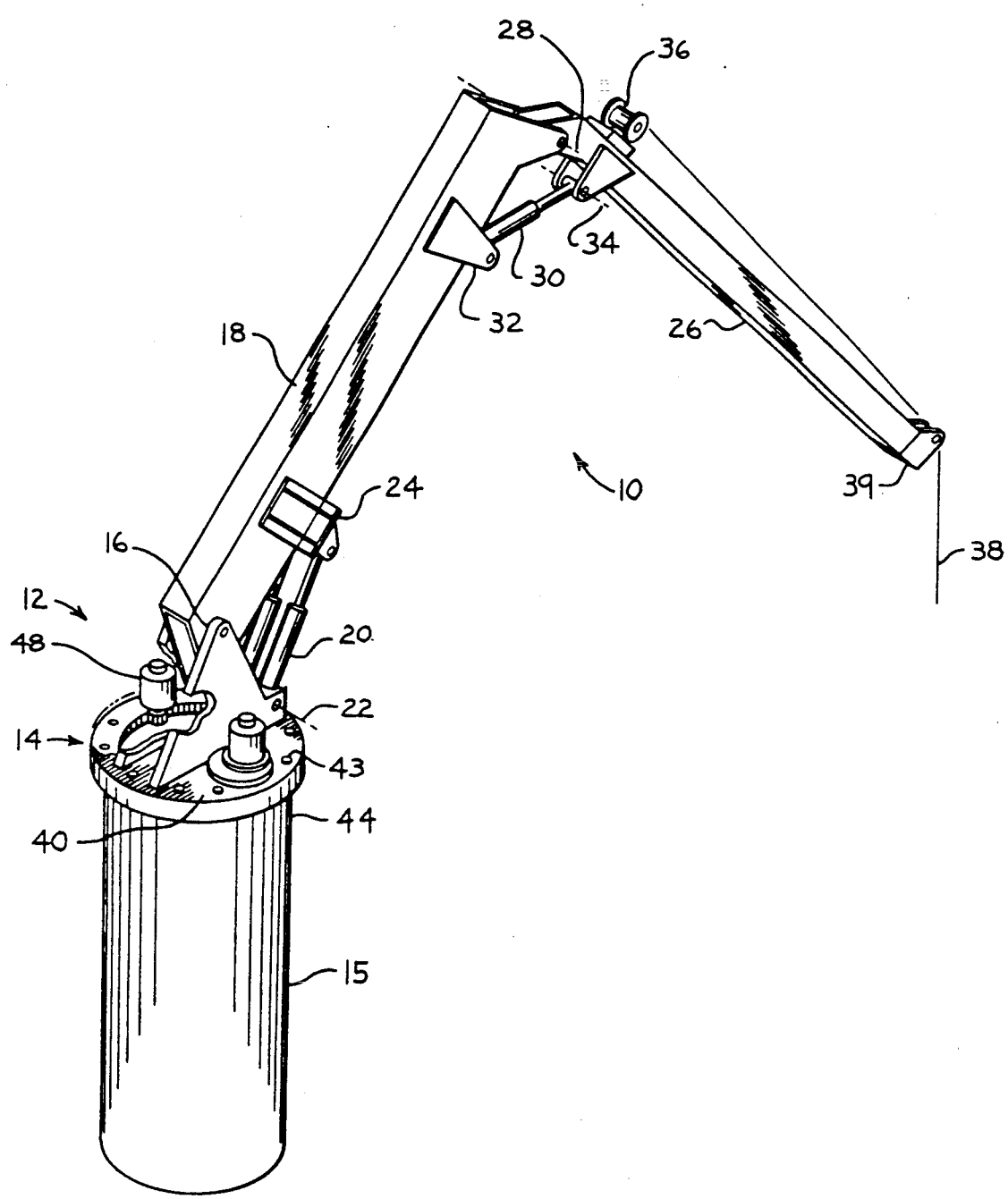
FIG. 1 is an isometric view of the present invention shown as adapted for use with a crane of the type commonly used on barges and other water vessels.

Referring initially to FIG. 1, the present invention is illustrated as employed in conjunction with a boom 10 for a crane powered by a slew drive 12 of the type commonly used on ships and barges. The boom 10 is mounted on a circular turntable 14 which in turn is supported by an upright post 15 which extends downwardly into the hull of the ship or barge (not shown). The boom is mounted on the turntable by a pair of upright mounting plates 16 disposed in spaced-apart parallel relationship to each other to receive the inward end of the inward section 18 of the boom. The inward section of the boom is raised and lowered by a pair of hydraulic cylinders 20 having their lower ends pinned to the mounting plates 16 about axis 22 and their upper ends pinned to cheek plates 24, welded or otherwise securely affixed to the sides of the boom inward section 18. Boom 10 also includes an outer section 26 pivotally pinned to the outer end of the boom inward section at axis 28. A hydraulic cylinder 30 is interconnected between the outer end of the boom inward section 18 and the inward end of the boom outer section 26 by lower inner cheek plates 32 and outer cheek plates 34 welded or otherwise securely affixed.

A powered drum 36 is mounted on the inward end of the boom outer section for taking in and paying out a loadline 38 which is guided at the outer end of the boom outer section 26 by a point block assembly 39. It will be appreciated that when the boom 10 is disposed in a horizontal orientation, the point block assembly 39 is at a considerable distance outward of the turntable 14 so that the arc swept by the point block assembly is substantially larger than the circumference of the turntable.

Figure 2:
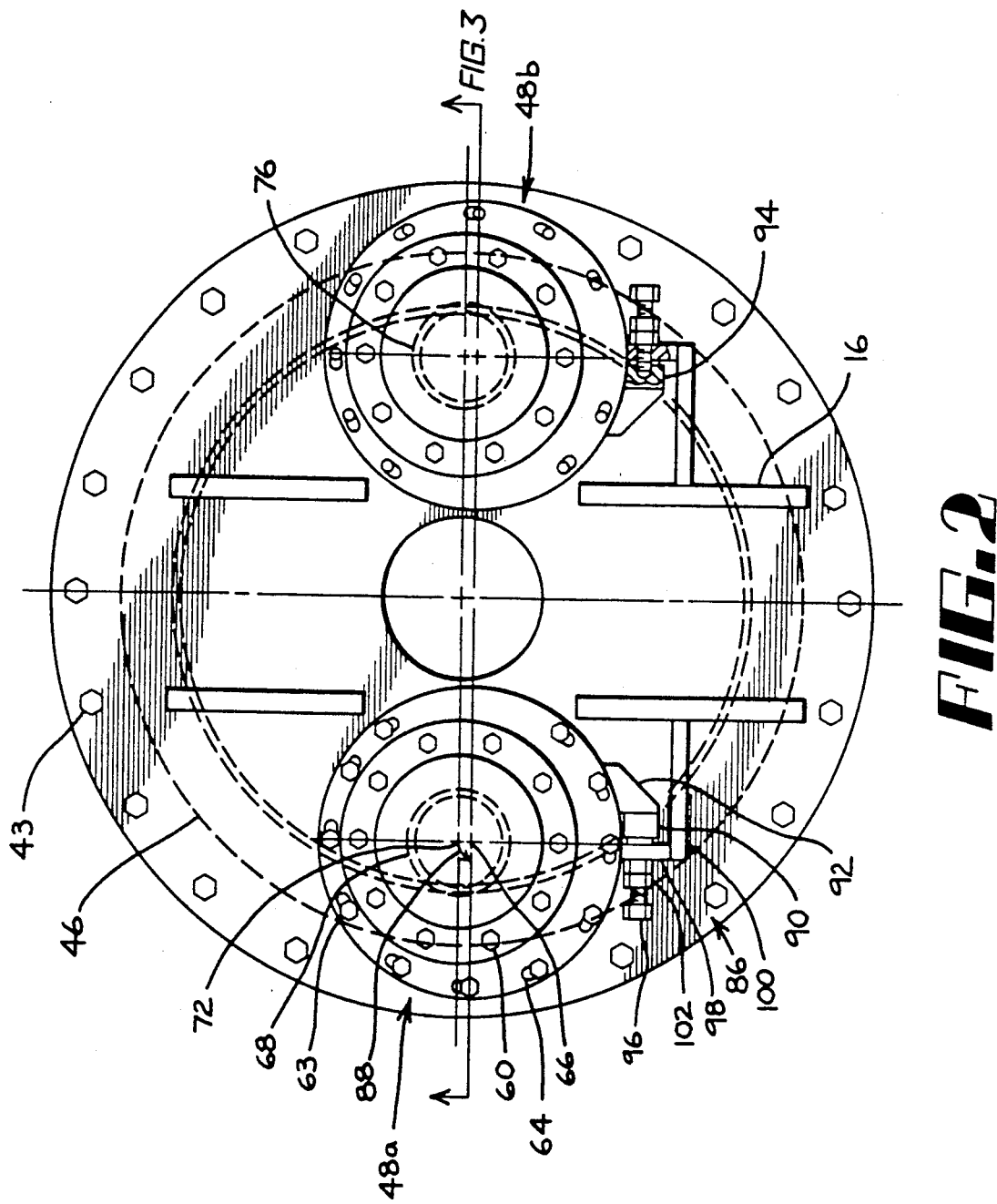
FIG. 2 is an enlarged, fragmentary top view of FIG. 1 with portions removed for clarity.
Figure 3:
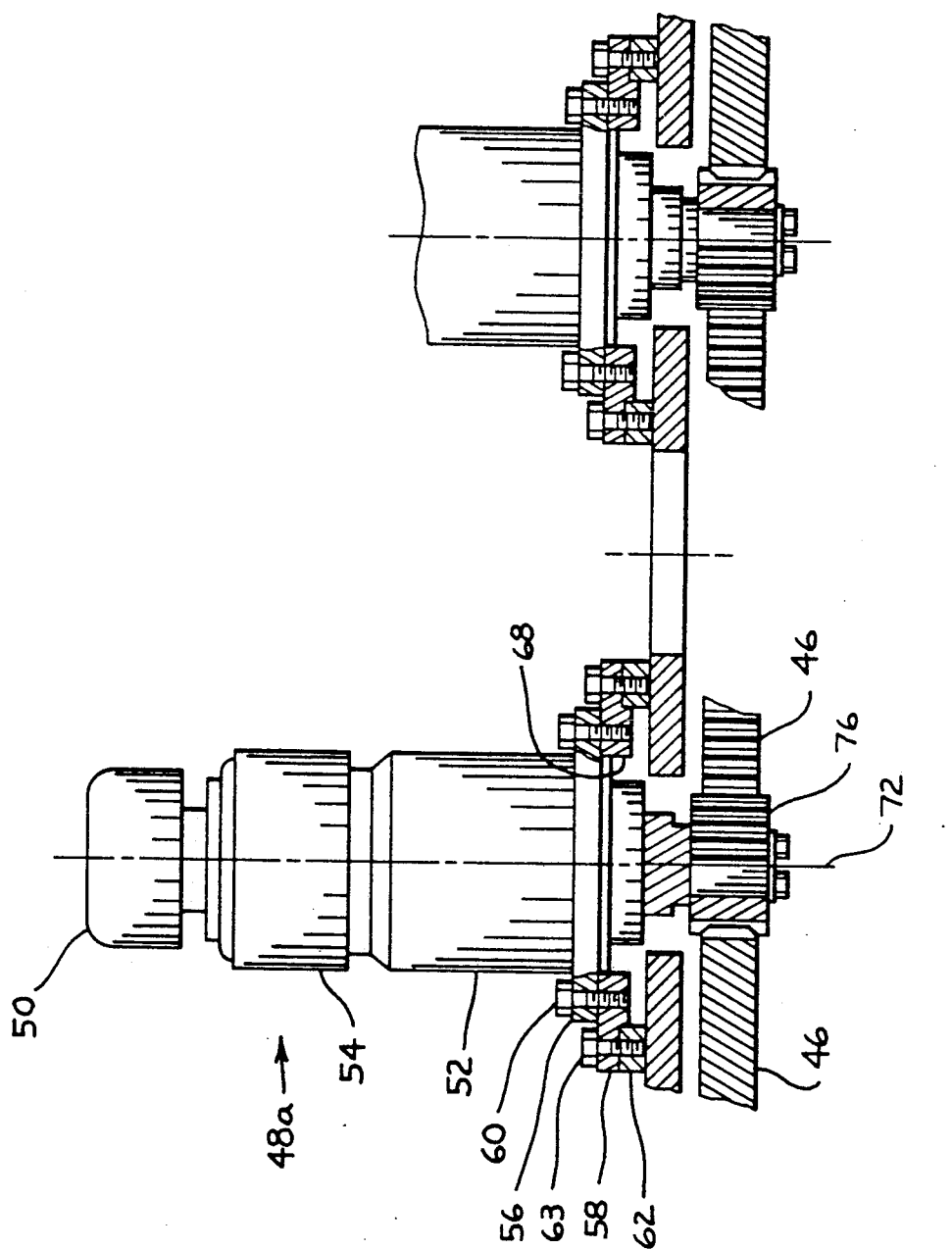
FIG. 3 is a cross-sectional view of FIG. 2 taken substantially along lines 3—3 thereof; and, FIG. 4 is an enlarged fragmentary view of a portion of FIG. 4.
Figure 4:
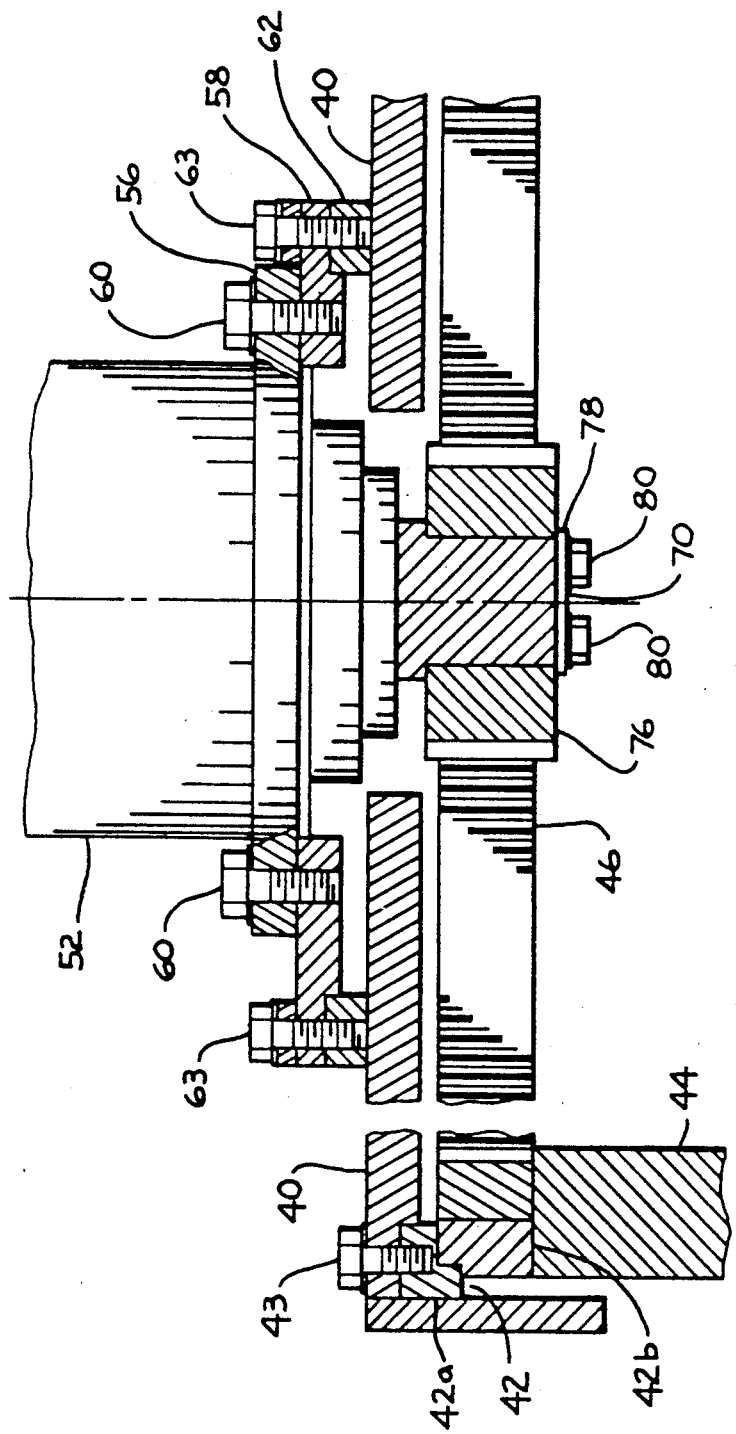

Next referring additionally to FIGS. 2-4, the turntable 14 includes a circular slew plate 40 supported by a two-piece annular radial thrust bearing 42 which in turn is supported by a base structure 44 at the upper end of the post 15. The radial thrust bearing includes an upper section 42a secured to the slew plate 40 by a series of capscrews 43 and a lower section 42b secured to the base structure 44 by any convenient method. As shown in FIG. 4, the upper bearing section 42a includes a downwardly extending shoulder portion to pilot the upper bearing section 42a relative to the lower bearing section 42b. An appropriate provision, not shown, is provided for preventing the upper bearing section 42a from being lifted upwardly relative to the lower bearing section 42b. It will be appreciated that by the construction of the bearing 42 the slew plate 40 is rotatable relative to the base structure 44.

An internal ring gear 46 is mounted coaxially within the bearing lower section 42b to remain stationary relative to the bearing lower section and thus also relative to the base structure 44.

A pair of motor drive assemblies 48a and 48b are mounted on the turntable 14 for rotating the slew plate 40, and thus the boom 10 relative to the base structure 44. Since the motor drive assemblies 48a and 48b are constructed essentially identically, only one will be described, with the understanding that the description also is applicable to the other motor drive assembly. The motor drive assembly 48a includes a hydraulic motor 50 interconnected to a speed reducer unit 52 through a brake mechanism 54. The motor 50, though preferably hydraulic in nature, can be of other types, including electrical.

The speed reducer 52 includes a lower annular flange 56 mounted on an eccentric, annular plate 58 by a plurality of bolts 60 extending through clearance holes formed in the flange and engaging within aligned threaded holes formed in the eccentric plate 58. The eccentric plate 58 is, in turn, mounted on lower ring plate 62 which is welded or otherwise affixed to the slew plate 40. Bolts 63 extend through circumferentially extending, oblong slots 64 formed in the outer perimeter of the eccentric plate 58 to engage with aligned threaded holes formed in the ring plate 62 in a circular pattern.

As illustrated in the drawings, the eccentric plate 58 is generally annular in shape having a central axis 66 disposed centrally relative to the slots 64 which cooperatively form a circular pattern. The eccentric plate also includes a circular aperture 68 to provide clearance for the speed reducer unit 52 and a drive shaft 70 extending downwardly therefrom. As shown in FIG. 2, the center 72 of the aperture 68 is offset from the central axis 66 of the eccentric plate 58. The threaded holes for reception of the bolts 60, used to mount the speed reducer unit 52 to the eccentric plate, form a circular pattern about the center 72 of the aperture 68. The relevance of constructing the eccentric plate in the foregoing manner will be discussed more fully below.

A pinion gear 76 is secured to the lower end of the drive shaft 70 via circular keeper plate 78 held in place by a pair of capscrews 80 extending upwardly through clearance holes formed in the keeper plate to engage within threaded blind holes formed in the lower end of the drive shaft 70. Splines, a key and keyway, or other well-known system (not shown) can be utilized to prevent the pinion gear 76 from rotating relative to the drive shaft 70. The pinion gear 76 meshes with the internal ring gear 46 so that rotation of the pinion gear by the motor 50 causes the slew plate 40, and thus the boom 10, to rotate relative to the base structure 44.

The orientation of the eccentric plate 58 may be adjusted about its central axis 66 by an adjustment system 86 which, as described more fully below, positions the teeth of the pinion gear 76 in closer proximity with or further proximity from the teeth of the ring gear 46 depending upon the direction that the eccentric plate is rotated. The rotational axis of the pinion gear 76 corresponds to the center 72 of the aperture 68, which central axis 72 is offset from the central axis 66 of the eccentric plate 58. Thus, when the eccentric plate 58 of the motor drive assembly 48a is rotated about its central axis 66 for instance in a counterclockwise direction, the central axis 72 of the pinion gear travels about a path constituting the segment of the circle, with the center of such circle defined by axis 66 and the radius of the circle defined by the distance separating axis 66 from 72. This path is depicted in FIG. 2 by an arrow 88. The movement of the pinion gear 74 in the counterclockwise direction along arrow 88 shifts the pinion gear outwardly toward the outer circumference of the slew plate 40 and correspondingly into deeper engagement with the teeth of the ring gear 46 thereby to reduce the backlash between the teeth of the pinion and ring gears to compensate, for instance, for the wear of the teeth occurring during normal use of the boom 10.

As noted above, rotational adjustment of the eccentric plate 58 is accomplished through the adjustment mechanism 86. This mechanism includes a striker plate 90 mounted perpendicularly to the outer circumference of the ring plate 62 by an angle bracket 92. The striker plate 90 is formed with a socket 94 for receiving the leading end of an adjustment screw 96 which is engagable through a threaded hole formed in support plate 98 extending transversely from the end of a bracket 100 mounted on the upper surface of the slew plate 40. The standout of the adjustment screw 96 is maintained by a pair of lock nuts 102 disposed between the head of the screw 96 and adjacent surface of mounting plate 98.

It will be appreciated that threadably engaging of the screw 96 with the adjustment plate 94 causes the tip of the screw to push against the striker plate 90 thereby to rotate the eccentric plate 58 in the counterclockwise direction (providing that the bolts 63 have been previously loosened). As discussed above, this places the teeth of the pinion gear 76 into deeper engagement with the teeth of the ring gear 46 thereby to take up any excess clearance therebetween and thus reducing the backlash between the gears. The eccentric plate 58 is confined to rotate about the central axis 66 by virtue of the oblong slots 64 through which are engaged the bolts 63. Once the desired orientation of the eccentric plate 58 is achieved, the bolts 63 are simply retightened thereby to securely maintain the eccentric plate and thus also the pinion gear 76 in desired position relative to the ring gear 46. It will be appreciated that very minute adjustments of the rotation of the eccentric plate 58 about its central axis 66, and thus the position of the pinion gear 76 relative to the ring gear 46, is achievable by rotation of the adjustment screw 66. Also, once the desired orientation of the eccentric plate 58 is achieved, the lock nuts 102, engaged on the adjustment screw 96, are retightened to assist in maintaining the orientation of the eccentric plate.

Although a preferred manner of adjusting the rotational position of the eccentric plate 58 through the use of the adjustment mechanism 86 has been described and illustrated, it is to be understood that other methods and structures for adjusting the rotational position of the eccentric plate may be employed without departing from the spirit and scope of the present invention. Also, although the present invention has been described and illustrated as utilized with a ring gear and a pinion gear, the present invention can be utilized with other types of gear sets, such as with a spur and worm gear set or two spur gears. Moreover, other aspects of the present invention may be embodied in forms in addition to those specifically disclosed above without departing from the spirit and scope of the present invention. The particular embodiments of the present invention set forth above are therefore to be considered in all respects as illustrative and not restrictive. The scope of the present invention is as set forth in the appended claims rather than be limited to the examples set forth in the foregoing description.

Moreover, it will be appreciated that the present invention may be utilized in a wide variety of applications when it is desired to reduce the backlash between meshing gears. The present invention has been described above as used in conjunction with a boom for a crane powered by a slew drive of the type commonly used on ships and barges. In addition, the present invention may be utilized on other types of cranes, for instance, mobile cranes, dock side cranes, cranes used on logging trucks, etc. The present invention also may be used in conjunction with elongated booms, for instance, as used on fire engines, excavating shovels, etc. In all of these applications, excessive backlash in the gear drive train used to rotate the crane or boom makes it extremely difficult to precisely position the end of the crane or boom. However, through the present invention, excessive backlash of the gears composing the drive train may be eliminated so that the end of the elongate crane or boom does not swing out of control.

In addition to being utilized in conjunction with cranes or booms, the present invention may also be employed whenever it is desirable to minimize backlash between mating gears, for instance, in a servo drive system.

The embodiments of the invention in which an exclusive property or privilege is claimed are defined as follows:

1. An antibacklash gear drive system for an elongate boom having a support frame that is rotatably supported by a base, the antibacklash gear drive system transmitting motion from a drive input member that is rotatable about a drive axis to an output member, comprising:

(a) a first gear nonrotatably secured to the drive input member to rotate with the drive input member about the drive axis;

(b) a second gear meshed with the first gear and mounted about a second axis to the output member to rotate the boom relative to the base; and, (c) adjustment means for selectively positioning one of the first and second gears relative to the other of the first and second gears, and then securing the positionable gear, to adjust and maintain the distance separating the drive axis and second axis to adjust the backlash between the first and second gears.

2. The antibacklash gear drive system of claim 1, wherein the adjustment means includes mounting means for moving said positionable gear to position the axis of said positionable gear at a location along an arcuate path extending toward and away from the other gear.

3. An antibacklash gear drive system according to claim 2, wherein said mounting means have portions rotatable about a circular path thereby to position said positionable gear about an arcuate path.

4. The antibacklash gear drive system according to claim 3, wherein the mounting means comprises a mounting ring rotatably adjustable about an axis of rotation, the axis of said positionable gear offset from the axis of the mounting ring.

5. The antibacklash gear drive system according to claim 2, wherein the first and second gears are selected from the group consisting of: a ring gear and a pinion gear; a spur gear and a worm gear; and two spur gears.

6. An antibacklash gear drive system according to claim 2, wherein the first and second gears is mountable to the base, and the first gear is mounted on the support frame of the boom and is positionable to selectively adjust the backlash between the first and second gears.

7. The antibacklash gear drive system according to claim 1, wherein the adjustment means includes an eccentric mounting ring for rotatably mounting one of the first and second gears about its axis of rotation, the mounting ring being rotatable about its own axis of rotation which is offset from the axis of rotation of the gear carried by the mounting ring whereby rotation of the mounting ring about its central axis of rotation results in the movement of the rotational axis of the gear carried by the mounting ring about an arcuate path disposed about the central axis of the mounting ring at a radius corresponding to the distance separating the central axis of the mounting ring from the rotational axis of the gear carried by the mounting ring.

8. The antibacklash gear drive system according to claim 7, wherein the eccentric mounting ring defines a plurality of circumferentially extending oblong slots for selectively securing the eccentric mount ring to the support frame.

9. The antibacklash gear drive system according to claim 7, wherein the first gear comprises a pinion gear rotatably mounted by the mounting ring and the second gear comprises a ring gear.

* * * * *